(12) United States Patent
Horsting

(10) Patent No.: US 6,635,847 B2
(45) Date of Patent: Oct. 21, 2003

(54) METHOD OF FORMING ORIFICES AND CHAMFERS BY COLLIMATED AND NON-COLLIMATED LIGHT

(75) Inventor: John James Horsting, Williamsburg, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/917,917

(22) Filed: Jul. 31, 2001

(65) Prior Publication Data

US 2003/0024910 A1 Feb. 6, 2003

(51) Int. Cl.⁷ .......................... B23K 26/38; B23K 26/06
(52) U.S. Cl. .......................... 219/121.71; 219/121.73; 219/121.75
(58) Field of Search .................. 219/121.7, 121.71, 219/121.73, 121.76, 121.77, 121.74, 121.75

(56) References Cited

U.S. PATENT DOCUMENTS

| | | |
|---|---|---|
| 3,953,706 A | 4/1976 | Harris et al. |
| 4,059,876 A | 11/1977 | Ditto ..................... 29/156.7 A |
| 4,160,894 A | 7/1979 | Stemmler et al. |
| 4,370,540 A | 1/1983 | Davis et al. |
| 4,694,139 A | 9/1987 | Röder ......................... 219/121 |
| 4,818,834 A | 4/1989 | Rupert .................... 219/69.17 |
| 4,911,711 A | 3/1990 | Telfair et al. .................. 606/5 |
| 5,043,553 A | 8/1991 | Corfe et al. ............. 219/121.7 |
| 5,093,548 A | 3/1992 | Schmidt-Hebbel ..... 219/121.71 |
| 5,163,934 A | 11/1992 | Munnerlyn ..................... 606/5 |
| 5,237,148 A | 8/1993 | Aoki et al. .............. 219/121.7 |
| 5,523,544 A | 6/1996 | Hertzel et al. ........... 219/121.7 |
| 5,607,606 A | 3/1997 | Mori et al. ............ 219/121.67 |
| 5,632,083 A | 5/1997 | Tada et al. ..................... 29/827 |
| 5,885,199 A | 3/1999 | Shao ............................. 483/19 |
| 6,172,331 B1 * | 1/2001 | Chen ..................... 219/121.71 |
| 6,229,113 B1 * | 5/2001 | Brown .................... 219/121.7 |
| 6,264,486 B1 | 7/2001 | Jiang et al. .................. 439/161 |

FOREIGN PATENT DOCUMENTS

| | | |
|---|---|---|
| GB | 2 328 894 | 3/1999 |
| JP | 9-236066 | 9/1997 |

OTHER PUBLICATIONS

U.S. patent application Ser. No. 09/917,918, J. Horsting, et al., filed Jul. 31, 2001.
U.S. patent application Ser. No. 09/909,974, C. Hamann, filed Jul. 23, 2001.

* cited by examiner

*Primary Examiner*—Geoffrey S. Evans

(57) ABSTRACT

A method of and apparatus for forming chamfers in an orifice of a workpiece. The orifice has an axis, which extends between a first surface and second surface of the workpiece, where the first and second surfaces are parallel to each other. The chamfers are disposed between the first surface and the second surface. The method includes forming an orifice in a workpiece with a source of collimated light directed at the workpiece at a predetermined first time interval, and forming a chamfer with a source of non-collimated light at a second time interval during the first time interval. The apparatus includes at least one source of collimated and non-collimated light, a collimated light filter, and a non-collimated light generating arrangement, and at least one shutter and at least one iris that direct collimated and non-collimated light at the workpiece to form the orifice. The apparatus is configured such that the orifice has a surface roughness of between approximately 0.05 microns and approximately 0.13 microns and a coefficient ratio of at least approximately 0.6.

23 Claims, 2 Drawing Sheets

METHOD OF FORMING ORIFICES AND CHAMFERS BY COLLIMATED AND NON-COLLIMATED LIGHT

BACKGROUND OF THE INVENTION

Fuel flowing through a fuel injector typically exits at a nozzle end of the fuel injector. The nozzle end is believed to have a disk with at least one orifice to control, in part, the spray pattern and the direction of the fuel exiting the fuel injector.

The orifice is believed to be formed by drilling through a flat workpiece. The method of drilling orifices for fuel injector is believed to be electric discharge machining (EDM) that can form orifices of 150 to 200 microns in diameter. It is believed that one of the many disadvantages of EDM is the fact that the holes are typically formed without any favorable entry or exit geometry for the orifices, thereby affecting the flow through the orifices. It is further believed that EDM drilling for orifices smaller than 150 microns takes twice as long to complete. Moreover, it is believed that to maintain the same amount of fuel flow with the smaller orifice may require more than four times the number of the larger orifices. This is believed to reduce productivity in the manufacturing of the fuel injector. Additionally, it is believed that EDM forming of the orifices are not uniform between individual injectors, thereby causing the fuel injector spray to also be non-uniform between individual injectors.

Future emission standards for gasoline and diesel engines are believed to require the use of smaller orifices for smaller fuel spray droplets and shorter fuel spray duration. It is believed that fuel spray pattern and flow should remain uniform between adjacent cylinders in a multi-cylinder engine.

It is believed that smaller orifices can be formed with no loss in productivity through the use of laser machining. At least two techniques are believed to be used for laser machining orifices. One is trepanning or helical drilling, the other is percussion drilling. Percussion drilling is believed to be less than desirable due to the random nature of metal heating and expulsion that most likely results in a non-cylindrical or non-circular orifice. Trepanning, on the other hand, is believed to be more precise as a center hole is believed to be initially formed before the formation of the orifice. Helical drilling is similar to trepanning but without the initial formation of a center hole. However, it is believed that neither trepanning nor percussion drilling provides for a desired formation of entry and exit geometry in the orifices.

SUMMARY OF THE INVENTION

The present invention provides for at least one method of forming chamfers and an orifice together while maintaining dimensional consistency between a plurality of orifices formed by the method. In one preferred embodiment of the invention, the method is achieved by forming at least one orifice in a workpiece with collimated light being produced by at least one laser light source directed at the workpiece at a predetermined first time interval; and forming at least one chamfer with non-collimated light being produced by the at least one laser light source at a second time interval during the first time interval. The orifice formed by the method has an axis, which extends between a first surface and second surface of the workpiece with the at least one chamfer being disposed between the first surface and the second surface.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENTS

Figure 1:
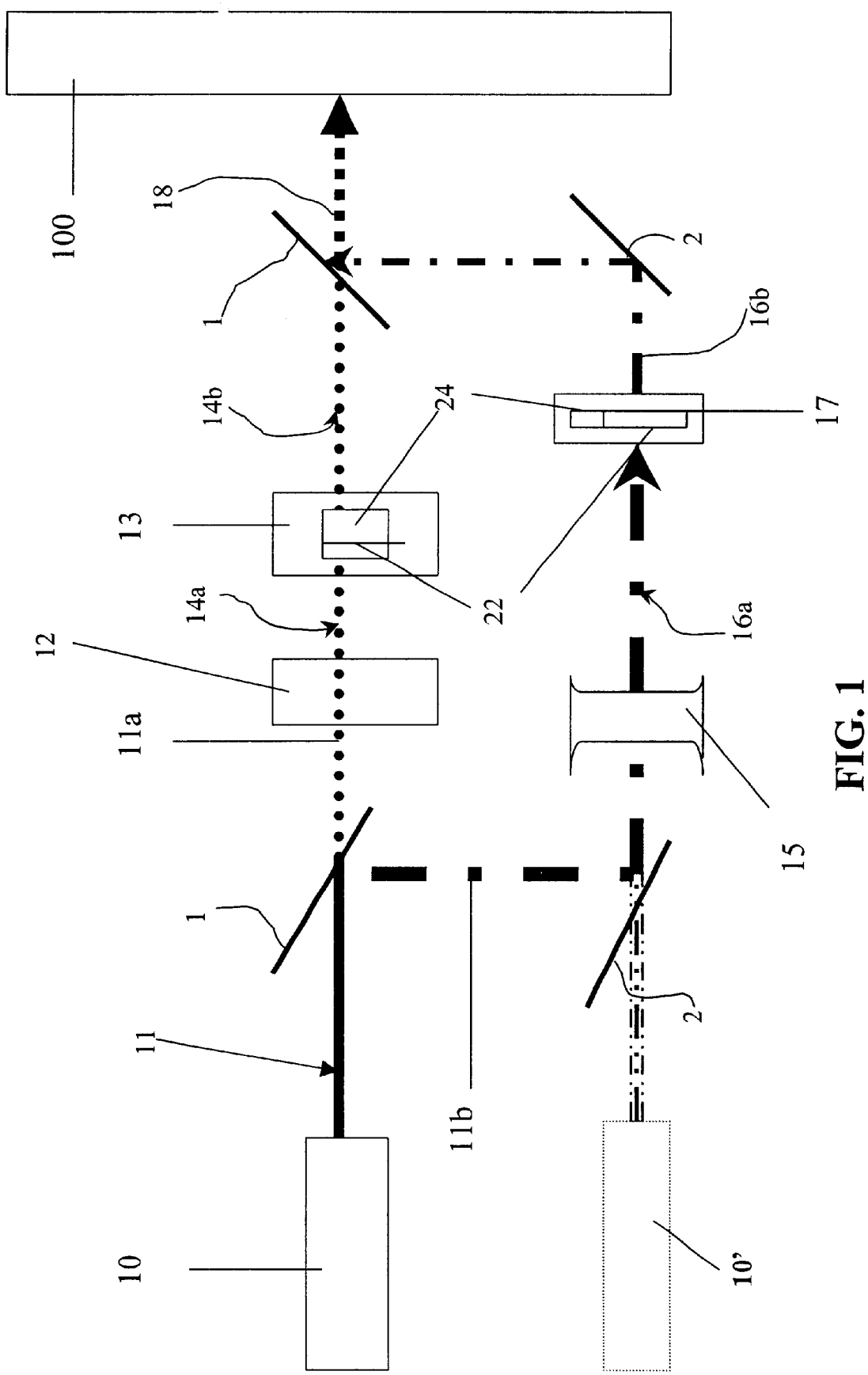
FIG. 1 is a schematic view of the components required to form an orifice according to a preferred embodiment.
Figure 2:
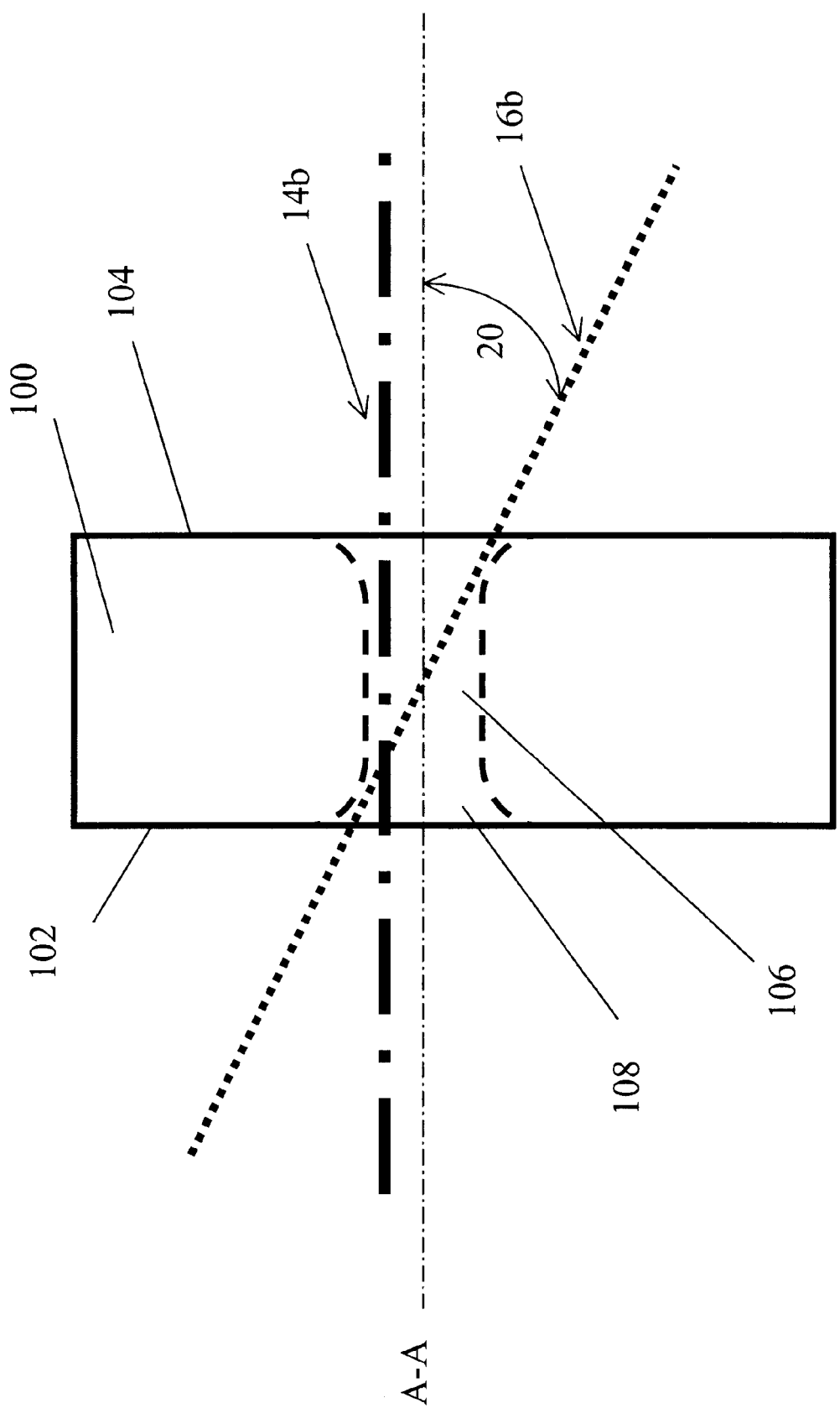
FIG. 2 is an illustration of the orifice and chamfer formed according to the preferred embodiment.

FIGS. 1 and 2 show a preferred embodiment that allows substantially simultaneous laser machining of at least one orifice and at least one chamfer in a work piece. Referring to FIG. 1, a laser light source 10 of a combination of collimated and uncollimated light ("collimated/uncollimated light") 11 is provided. Preferably, the laser light source 10 can be Model LM100 or LM150 sold by Oxford Laser™.

A partial reflector 1 splits the collimated uncollimated light 11 into two beams 11a and 11b of which collimated and uncollimated lights can be extracted. One of the various techniques in which collimated light can be extracted from light beam 11a can be by, for example, a first filter assembly 12, having an optical arrangement with a pinhole. The first filter assembly 12 can remove the non-collimated light from collimated/uncollimated light 11 to provide substantially collimated light 14a. Another technique can be by directing the laser light to a "scraper mirror" that filters out non-collimated light. The "scraper mirror" essentially is a mirror with a preconfigured hole placed at the center of the mirror. The substantially collimated light 14a is delivered to a first power controlling assembly 13 that can be, for example, a shutter and iris assembly. The first power controlling assembly 13 can be used to deliver a desired amount of power of collimated light 14b to the work piece 100.

The other light beam 11b is diverted by reflector 2 to a second filter assembly 15 that filters out collimated light to deliver mostly non-collimated light 16a to a second power controlling assembly 17. The second filter assembly 15 can be a beam expander, such as, for example, a diverging lens or focusing optics with a pinhole to filter out collimated light leaving mostly non-collimated light 16a that is delivered to the second power controlling assembly 17. The second power controlling assembly can be, for example, a shutter and iris arrangement to control the intensity or the power of the non-collimated light 16b.

Another way to provide collimated light and non-collimated light can be, for example, by utilizing a plurality of light sources. One light source of the plurality of light sources can be a first light source that produces nearly all collimated light. Another light source of the plurality of light sources can be a second light source 10' that produces a desired amount of non-collimated light. Alternatively, at least one of the plurality of light sources can be a non-laser light source while the other light source(s) of the plurality of light sources can be a laser light source. Where two or more laser light sources are used to produce the respective collimated light and uncollimated light, the laser light sources can be individually pulse width modulated to control the power density or irradiance of the respective collimated light and non-collimated light. The use of two or more light sources are believed to eliminate separate optical arrangements 12, 15 and light controlling assemblies 13, 17 that is believed to be required for a single source.

The collimated light 14*b* and the non-collimated light 16*b* are delivered to another partial reflector 1 that, preferably, permits the lights 14*b* and 16*b* to combine into beam 18 to machine the orifice and the chamfer. In one preferred embodiment, the collimated light 14*b* can be controlled and directed at the workpiece 100 to form at least one orifice during a first time interval while the non-collimated light 16*b* (produced by a laser or a non-laser light source) can also be independently controlled and directed at the workpiece 100 at a predetermined second time interval to form at least one chamfer. The power density or irradiance of the respective collimated and uncollimated light (from a single laser source, separate laser sources, or a laser with a non-laser) can be regulated to define a ratio of collimated light to non-collimated light. In particular, the power of the collimated and non-collimated lights 14*b* and 16*b* can be controlled, for example, by using at least one pulsed laser machine that and by pulse width modulation and/or by varying at least one of the lights 14*b*, 16*b* as a function of a predetermined irradiance and/or fluence. Alternatively, at least one continuous wave laser machine can be used instead of a pulsed laser machine.

Preferably, the ratio of irradiance, or power density, between the collimated and non-collimated light 14*b*, 16*b* can be between approximately 1:1 to approximately 0.1:1, and the diameter of the non-collimated light 16*b* can be approximately 1 to approximately 2 times a diameter of the collimated light 14*b*. The laser light source 10 can be either a gas or a solid-state laser. Preferably, the power density of the laser light source 10 should be less than or equal to $1 \times 10^{12}$ Watts per centimeter-squared (1 Terawatt/$cm^2$) and at least $1 \times 10^6$ Watts per centimeter-squared (1 Megawatt/$cm^2$). Preferably, the laser light source 10 can be a copper vapor laser or a frequency doubled neodymium: yttrium-aluminum-garnet (Nd: YAG) laser having a wavelength between approximately 511 nanometer to approximately 578 nanometer.

Referring now to FIG. 2, the orifice 106 has an axis A—A which extends between a first surface 102 and second surface 104 of the workpiece 100, where the first and second surfaces 102, 104 can be parallel or non-parallel to each other. Preferably, the first surface is parallel to the second surface. The at least one chamfer 108 can be disposed between the first surface 102 and the second surface 104. The orifice 106 is preferably is between approximately 20 microns and approximately 650 microns in diameter. As described herein, the term "chamfer" refers to a surface geometry of an orifice that can include an opening of the orifice or at any point between the first surface and the second surface of the at least one orifice. The surface geometry can be, for example, a square edge, a taper or a cone.

In the preferred embodiments, the first and second time intervals can overlap each other. Alternatively, the collimated light and non-collimated light corresponding to one of the first and second time intervals can be while the light corresponding to the other time interval is not initiated until a time interval has passed such that the first and second time intervals end at the same instant in time. Preferably, the first and second time intervals are initiated substantially simultaneously and can terminate at the same time or at different intervals.

In another preferred embodiment, one of the collimated light 14*b* or the non-collimated light 16*b* can be directed at the workpiece 100 to form an orifice during a first time interval while the other of the collimated light 14*b* and non-collimated light 16*b* can be rotated at a predetermined intensity at an angle of incidence about the axis of orifice 106 to generate a chamfer during a second time interval that overlaps the first time interval.

Using the preferred embodiments, it is believed that the surface roughness $R_a$ of the orifice 106 should be less than approximately 0.2 microns and preferably can be between approximately 0.05 microns and approximately 0.13 microns such that the surface roughness and the cross-sectional shape of the chamfer(s) result in an orifice coefficient between approximately 0.6 and approximately 1.0. As used here, the term "surface roughness $R_a$" is an arithmetic mean value of the absolute values of a surface profile divided by the quantity of the values sensed by a sensing instrument, such as, for example, a surface profilometer or even by optical scanning, including a laser type atomic force microscope.

It is believed that the optimum shape for chamfers 108 of the orifice 106 can be, for example, a bell shaped chamfer 110 or a conical shaped chamfer 112. For example, an orifice may have two substantially bell shaped chamfers 110 for the respective ends of the orifice. Alternatively, the orifice may have two conical shaped chamfers 112 or a combination of conical shaped chamfers 112 at one end and a bell shaped chamfer at the other end. A conical shaped chamfer 112 can be defined by a cone whose walls diverge at a constant angle. A bellshaped chamfer 110 consists of two sections. At a first end, the walls of the bell diverge at a relatively large angle but the degree of divergence tapers off at the second end. At the second end, the divergence angle of the walls of the chamfer is very small. Although two examples are given, it should be noted, however, that the chamfer could be configured into any cross-sectional shape that, under actual flow conditions, will produce an orifice coefficient of at least 0.6. As used here, the term "orifice coefficient," or "coefficient of discharge", is a function of, among other variables, the ratio of the cross sectional area of the inlet with respect to the cross sectional area of the orifice itself as well as the Reynolds Number of the fluid flow through the orifice. The orifice coefficient is believed to be an indicator of frictional loss incurred by flow of a specified fluid within an orifice.

In operation, the method can be practiced by an apparatus that forms an orifice 106 and chamfers 108 in a workpiece 100. The orifice has an axis A—A extending between a first surface 102 and a second surface 104 of the workpiece 100. The apparatus can be a laser light source 10 of collimated and non-collimated light 14*b*, 16*b* or two or more separate sources (10 and 10') of collimated light and uncollimated light. Where a single light source is used, a collimated light filter 12, and a non-collimated light generating arrangement 15, at least one shutter 22 and at least one iris 24 can be used to direct collimated and non-collimated light 14*b*, 16*b* at the workpiece 100 to form the orifice 106 and the chamfer. By controlling the intensity of the collimated with respect to the non-collimated light and controlling the focus of the two types of light from a single source or from two or more separate light sources, the apparatus can be used to form at least one orifice 106 that has a surface roughness of between approximately 0.05 microns and approximately 0.13 microns and a coefficient ratio at least approximately 0.6.

The preferred embodiments described herein can be used to form orifices for use in fuel injectors. Other applications can include, for example, ink-jet and laser printers, microcircuits including microcircuit boards, micro-machined devices, or any other devices which require a plurality of orifices of consistent dimensionalities and an uniform orifice coefficient of at least 0.6 for each of the orifices. The dimensionalities can be, for example, the diameter of the orifice or the diameters of the chamfer that can be used to describe the cross-sectional curve of the chamfer in three-dimension.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

1. A method of forming at least one chamfer and at least one orifice in a workpiece, the at least one orifice having an axis extending between a first surface and second surface of the workpiece, the at least one chamfer being disposed between the first surfaces and the second surfaces, the method comprising:

forming at least one orifice in a workpiece with collimated light being produced by at least one laser light source directed at the workpiece at a predetermined first time interval; and forming at least one chamfer with non-collimated light being produced by the at least one laser light source at a second time interval during the first time interval.

2. The method according to claim 1, wherein the first time interval includes a portion of the second time interval.

3. The method according to claim 1, wherein the first time interval is substantially equal to the second time interval.

4. The method according to claim 1, wherein a diameter of the at least one orifice is between approximately 20 microns and approximately 650 microns.

5. The method according to claim 1, wherein the first time interval is greater than the second time interval.

6. The method according to claim 1, wherein the second time interval is greater than the first time interval.

7. The method according to claim 1, further comprising:

separating collimated light from non-collimated light of the at least one laser light source; and controlling the power of the collimated and non-collimated light.

8. The method according to claim 7, wherein at least one of the forming of the at least one orifice and the forming of the at least one chamfer further comprises:

directing at least one of the collimated light and non-collimated light beams at a target at an angle of incidence, wherein the at least one of the collimated and non-collimated light beams are rotated with respect to the angle of incidence.

9. The method according to claim 7, wherein the controlling the power comprises pulse width modulating one of the collimated and non-collimated lights.

10. The method according to claim 7, wherein the controlling the power comprises varying each of the collimated and non-collimated lights as a function of a predetermined irradiance.

11. The method according to claim 7, wherein the controlling the power comprises varying each of the collimated and non-collimated lights as a function of a predetermined fluence.

12. The method according to claim 7, wherein the separating collimated light further utilizes an optical filter, a collimated light generating arrangement, at least one shutter and at least one iris disposed between the at least one laser light source and the workpiece.

13. The method according to claim 7, wherein the controlling of the collimated light further comprises rotating the collimated light at a predetermined intensity about the axis of the at least one orifice so as to generate at least one of a conical shaped chamfer and a bellshaped chamfer disposed between the first and second surfaces of the workpiece.

14. The method according to claim 1, wherein a power density of the collimated light comprises approximately 100% to approximately 200% of a power density of the non-collimated light.

15. The method according to claim 1, wherein the at least one laser light source comprises at least one of a gas or a solid-state laser.

16. The method according to claim 1, wherein a wavelength of the at least one laser light source comprises a wavelength between approximately 511 nanometers to approximately 578 nanometers.

17. The method according to claim 1, wherein the at least one laser light source comprises at least one of a copper vapor laser and a frequency doubled neodymium: yttrium-aluminum-garnet (Nd: YAG) laser.

18. The method according to claim 1, wherein a diameter of the non-collimated light comprises a diameter approximately 1 to approximately 2 times a diameter of the collimated light.

19. The method according to claim 1, wherein the surface roughness of the at least one orifice comprises a surface roughness between approximately 0.05 microns to approximately 0.13 microns.

20. The method according to claim 1, wherein the surface roughness of the at least one orifice is such that the orifice coefficient is at least 0.6.

21. The method according to claim 1, wherein a ratio of irradiance between the collimated and non-collimated light is between approximately 1 to 1 and approximately 0.1 to 1.

22. The method according to claim 1, wherein the at least one light source further comprises at least one collimated light source and at least one non-collimated light source.

23. The method according to claim 1, wherein the forming of the at least one chamfer further comprises forming at least one of a bellshaped chamfer and a conical shaped chamfer between the first surface and the second surface of the workpiece along the axis of the orifice.

* * * * *